United States Patent [19]

Ogborne et al.

[11] Patent Number: 4,506,503
[45] Date of Patent: Mar. 26, 1985

[54] GAS TURBINE ENGINE FUEL CONTROLLER

[75] Inventors: Graham E. Ogborne; Frederick J. Hill, both of San Diego, Calif.

[73] Assignee: Solar Turbines Incorporated, San Diego, Calif.

[21] Appl. No.: 373,805

[22] Filed: Apr. 30, 1982

[51] Int. Cl.³ .............................................. F02C 9/28
[52] U.S. Cl. ................................................. 60/39.281
[58] Field of Search ............................ 60/39.281, 243

[56] References Cited

U.S. PATENT DOCUMENTS

| | | | |
|---|---|---|---|
| 2,936,583 | 5/1960 | Turek et al. | 60/39.281 |
| 3,434,395 | 3/1969 | Londal | 60/39.281 |
| 3,672,163 | 6/1972 | White | 60/39.281 |
| 3,879,936 | 4/1975 | Stoltman | 60/39.281 |
| 4,087,961 | 5/1978 | Avery | 60/39.281 |

Primary Examiner—Louis J. Casaregola
Attorney, Agent, or Firm—LeBlanc, Nolan, Shur & Nies

[57] ABSTRACT

A controller [20] for scheduling the flow of a liquid fuel to a gas turbine engine [16]. The controller includes a fuel valve assembly [246], a compressor discharge pressure responsive ($P_{CD}$) actuator [150], a differential linkage assembly [152] which is connected to the $P_{CD}$ actuator and a fuel demand responsive actuator [142] and operates a metering valve [154] in the fuel valve assembly.

12 Claims, 15 Drawing Figures

Fig. 3
START

Fig. 4
ACCELERATION FROM START

Fig.5
ACCELERATION TO MAXIMUM SPEED

Fig.6
DECELERATION FROM MAXIMUM SPEED

GAS TURBINE ENGINE FUEL CONTROLLER

TECHNICAL FIELD

This invention relates to novel, improved controllers for scheduling the flow of liquid fuel to a gas turbine engine.

BACKGROUND ART

Many gas turbine fuel controls have heretofore been proposed. Among these and to some extent resembling the novel controllers disclosed herein in one or more respects are the devices disclosed in U.S. Pat. Nos. 2,697,909, issued Dec. 28, 1954, to Chandler; 2,796,733 issued June 25, 1957, to Pearl et al; 2,822,666 issued Feb. 11, 1958, to Best; 2,917,061 issued Dec. 15, 1959, to Longfellow; 2,941,601 issued June 21, 1960, to Best; 2,957,488 issued Oct. 25, 1960, to Farkas; 3,052,095 issued Sept. 4, 1962, to Prachar; 3,139,727 issued July 7, 1964, to Torell; 3,156,291 issued Nov. 10, 1964, to Cornell; 3,164,161 issued Jan. 5, 1965, to Tyler; 3,427,804 issued Feb. 18, 1969, to Lawrence; 3,469,397 issued Sept. 30, 1969, to Parker; 3,492,814 issued Feb. 3, 1970, to Urban; 3,606,754 issued Sept. 21, 1971, to White; 3,712,055 issued Jan. 23, 1973, to McCabe; 3,878,676 issued Apr. 22, 1975, to Hitzelberger; 3,879,936 issued Apr. 29, 1975, to Stoltman; and 3,939,649 issued Feb. 24, 1976, to McCabe.

The novel liquid fuel controllers disclosed herein are nonetheless unique and possess a combination of advantages not available in any heretofore proposed liquid fuel controller of which we are aware.

DISCLOSURE OF THE INVENTION

In general, our novel controllers include a unique differential linkage assembly which receives two inputs. One is from an electronic control module which generates a fuel demand signal in response to turbine load and is connected to the linkage through a hydroelectric actuator. The other input is from a compressor discharge pressure ($P_{CD}$) responsive actuator; its function is to furnish a compensation for variations in compressor discharge pressure.

The output from the mechanical differential linkage assembly serves as an actuator for a metering valve that controls the flow of fuel to the engine being served by the liquid fuel controller.

The function of the differential linkage assembly is to multiply the two variable inputs (fuel demand and $P_{CD}$) and generate an output which is the product of those variables.

This novel control philosophy provides a number of important advantages.

Because of its mechanical nature and construction, the control over fuel flow rate exercised by the differential linkage assembly is extremely accurate.

Also, there is essentially instantaneous response to changing loads, conditions requiring rapid shutdown, etc. Also, there is only one control philosophy over the entire range of operation from start-up to full load. Furthermore, temperature-based control is exercised over the rate of fuel flow throughout the entire range of fuel flow controller operation.

Still another important advantage of our novel liquid fuel controllers, attributable in large part to the mechanical differential linkage, is that the engines with which they are associated can be rapidly accelerated without surge (which can cause engine damage) and rapidly decelerated without flameout. For example, one 10,000 horsepower gas turbine engine equipped with a liquid fuel controller as described herein can be started cold and accelerated to a full speed and ready to load condition in only two minutes.

In addition, another advantage of our novel liquid fuel flow controllers, due principally to the mechanical differential linkage, is that they provide a liquid fuel schedule which is equivalent to that furnished by a gas fuel supply system. This is important because many applications—typically in the industrial gas turbine engine field—require that the engine be capable of operating on either a liquid or gas fuel. And, because of its compatability with gas fuel systems, our novel flow controller allows both it and the natural gas system to be operated from the same fuel demand actuator and electronic control unit, eliminating the otherwise requisite duplication of those components.

Further major components of our novel liquid fuel controllers are: (1) a $\Delta P$ regulator, which is employed to maintain a constant pressure drop across the metering valve by bypassing fuel to the liquid fuel supply or source; and (2) a pressurizing valve which maintains a sufficiently high back pressure on the system that there is, at all times, excess fuel that can be bypassed by the $\Delta P$ regulator; this insures that the pressure across the metering valve will not fall below the selected level.

These components are of novel construction which eliminates close tolerances. This is important in that those components can, as a consequence, handle contaminated (dirty) fuels without the various valves in the subject components sticking.

In fact, this philosophy is embodied throughout, making the entire fuel supply system capable of handling dirty fuels.

Other advantages of our invention, attributable to the major components discussed above and to the overall design of the controller, include: fail-safe operation; low cost; reliability; simplicity; long service life; flexibility; ease of, and low requirements for, maintenance; accuracy; repeatability; and low hysteris.

From the foregoing it will be apparent to the reader that the primary object of the present invention resides in the provision of novel, improved liquid fuel controllers for gas turbine engines.

Other, also important, but more specific, objects of our invention resides in the provision of liquid fuel controllers in accord with the preceding object which:

can be furnished at low cost;

are simple, flexible, accurate, and reliable;

are capable of fail-safe operation;

have a long service life;

are easy to maintain and have low maintenance requirements;

have a fast response to changes in power demand and compressor discharge pressure;

in conjunction with the preceding object, provide for rapid acceleration without surge and for rapid deceleration without flameout;

employ only a single control philosophy over the entire range of engine operation from start-up to full load;

permit engine temperature-based control to be exercised over the rate of fuel flow to the engine throughout the entire range of operation;

possess repeatability, low hysteresis, and the ability to handle contaminated fuels;

are compatible with gas fuel systems.

Other important objects and features and additional advantages of the invention will become apparent from the appended claims and as the ensuing detailed description and discussion proceeds in conjunction with the accompanying drawing.

BEST MODE FOR CARRYING OUT THE INVENTION

Figure 1A:
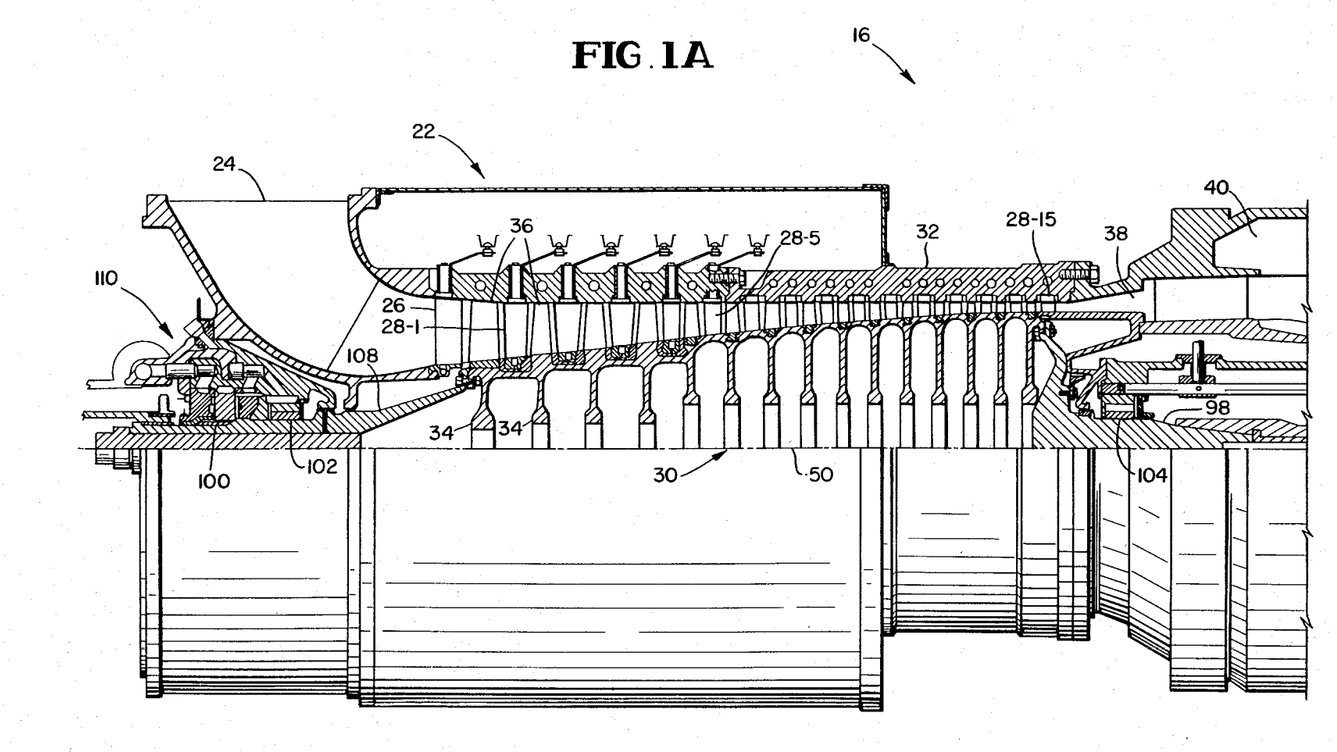
FIGS. 1A and 1B, taken together, constitute a partially sectioned side view of one gas turbine engine which may be equipped with a fuel flow scheduling controller embodying the principles of the present invention.
Figure 1B:
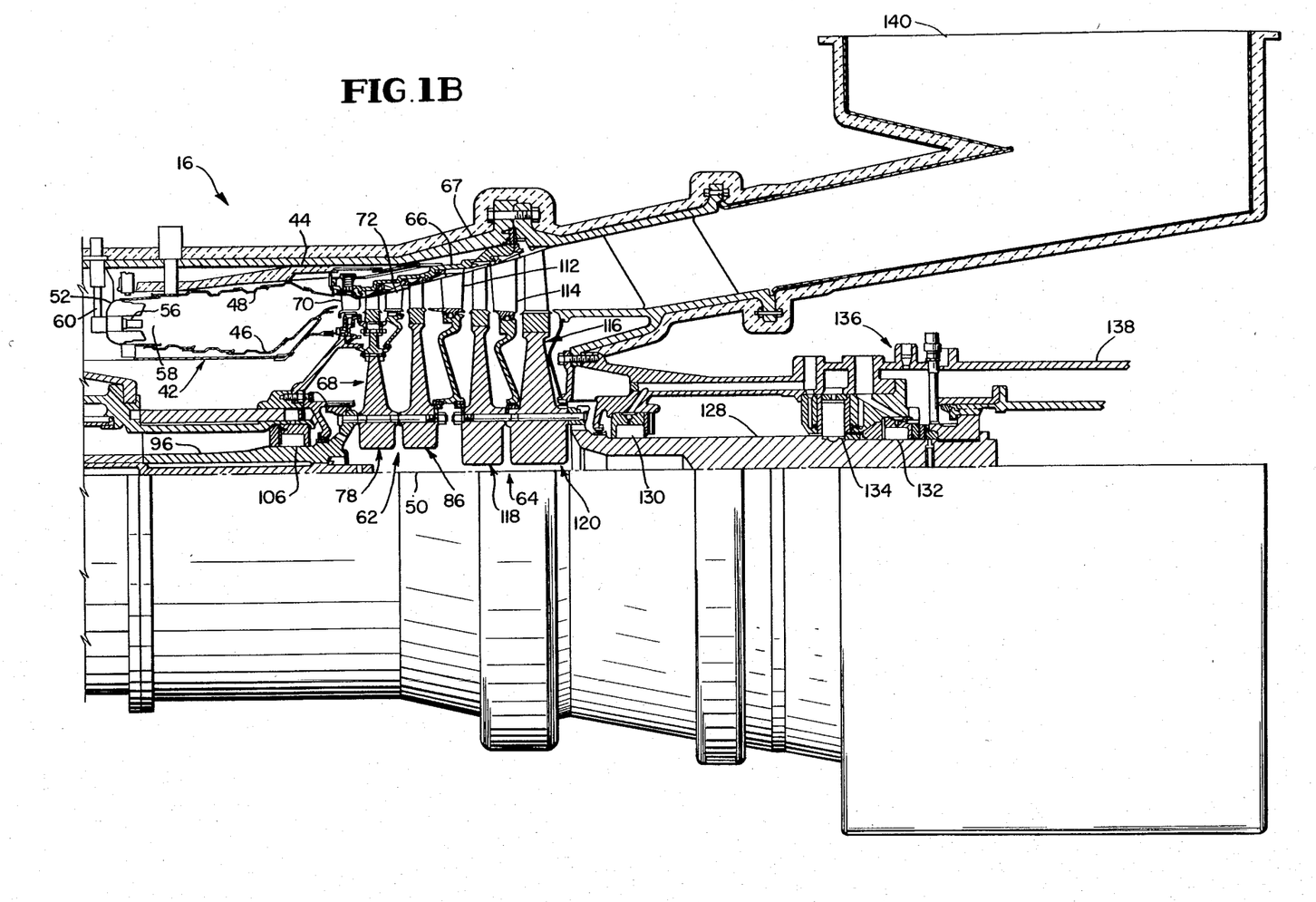

Referring now to the drawing, FIGS. 1A and 1B, taken together, depict a two-shaft, gas turbine engine 16 equipped with a fuel supply system 18 which includes a fuel scheduling controller 30 embodying and in accord with the principles of the present invention.

Engine 16 has, among its major components, a fifteen-stage axial flow compressor 22 with a radial-axial inlet 24, inlet guide vanes 26, stators 28, and a fifteen-stage rotor 30. The inlet guide vanes 26 and stators 28 are supported from the compressor housing 32 with the guide vanes and stators 28-1 through 28-5 of the first five stages being pivotally mounted so that they can be adjusted to control the flow of air through the compressor.

Each of the fifteen stages of the compressor rotor 30 consists of a disc 34 with radially extending blades 36 fixed to the periphery of the disc. The stages are integrated into a unitary structure as by electron beam welding.

The high pressure air discharged from compressor 22 flows through a diverging diffuser 38 and an enlarged dump plenum 40 to an annular combustor 42 supported in an insulated combustor case 44.

Combustor 42, which is of the annular type, includes inner and outer lines 46 and 48 concentric with the axial centerline 50 of the engine and an annular combustor dome 52 spanning the gap between the liners at the forward or upstream end of the combustor.

Injectors 56 slidably mounted in dome 52 at generally equidistantly spaced intervals therearound discharge fuel into the annular combustion zone 58 between inner and outer liners 46 and 48. The fuel flows from fuel supply system 18 to injectors 56 through holders 60 which extend outwardly from combustor dome 52 through combustor case 44.

The compressor discharge air heated by combustor 42 and the combustion products generated in the combustor are expanded through a two-stage gas producer turbine 62 and then through a two-stage power turbine 64. The turbines are rotatably supported in a nozzle case 66 mounted in an annular turbine housing or case 67.

The gas producer turbine 62 has a two-stage rotor 68 and stationary, internally cooled, first and second stage nozzles 70 and 72. First stage nozzles 70 are assembled into an annular array or ring as are the second stage nozzles 72.

The two stages 78 and 86 of the gas producer turbine rotor 68 are bolted to each other and, in cantilever fashion, to the rear end of a forwardly extending shaft 96. Shaft 96 is coupled through rear compressor hub 98 to compressor rotor 30, thereby drive-connecting gas producer turbine 62 to the compressor.

The compressor and gas producer turbines are rotatably supported by a thrust bearing 100 and by tapered land bearings 102, 104, and 106. Bearings 100 and 102 engage the front compressor hub 108 which is bolted to rotor 30 and is drive-connected to an accessory drive 110.

Power turbine 64 includes first and second stage nozzles 112 and 114, also supported from nozzle case 66, and a rotor 116 having a first, bladed stage 118 and a second, bladed stage 120.

Like the nozzles of the gas producer turbine 62, the first and second stage nozzles 112 and 114 of power turbine 64 are assembled into stationary annular arrays or rings.

Power turbine rotor stages 118 and 120 are bolted together for concomitant rotation. Rotor 116 is bolted to a power turbine shaft assembly 128 rotatably supported by tapered land bearings 130 and 132 and a thrust bearing 134. The shaft assembly is connected through a coupling 136 to an output shaft assembly 138 which furnishes the input for a generator, booster compressor, mechanical drive, or other driven unit (not shown).

The final major component of turbine engine 16 shown in FIGS. 1A and 1B is an exhaust duct 140 for the gases discharged from power turbine 64.

Figure 2:
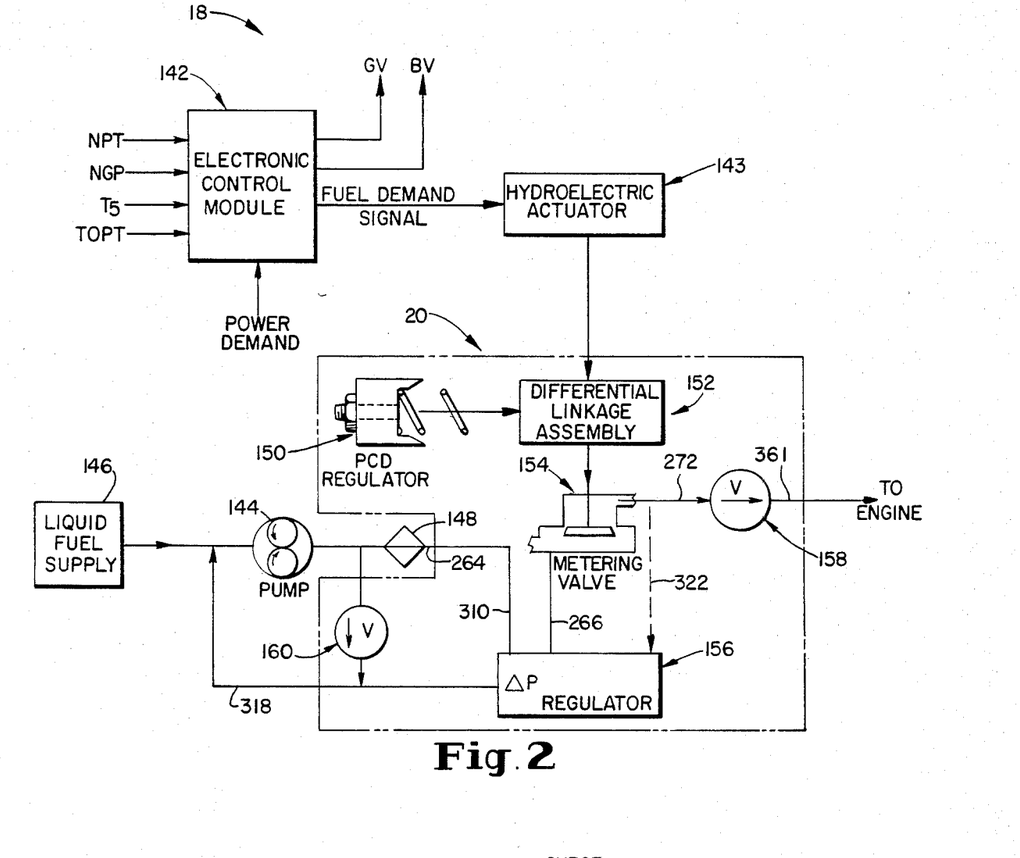
FIG. 2 is a schematic view of a gas turbine engine liquid fuel supply system and controller as aforesaid.

Referring again to the drawing, FIG. 2 depicts, in schematic form, the fuel supply system 18 of gas turbine engine 16. In addition to the fuel scheduling (or flow) controller 20 alluded to above, fuel supply system 18 numbers, among its major components, an electronic control module 142 which converts a number of inputs including the load upon gas turbine engine 16 into an electrical fuel demand signal and a hydroelectric (e.g., Ledeen) actuator 143 which converts the electrical fuel demand signal into a mechanical input to fuel flow controller 20.

Also, fuel supply system 18 includes a pump 144 for effecting a flow of liquid fuel from a liquid fuel supply 146 through a filter 148 first to liquid fuel flow controller 20 and then to the fuel injectors 56 of gas turbine engine 16.

Components of fuel supply system 18 such as hydroelectric actuator 143, pump 144, and filter 148 can be of any suitable character, and such components are readily available. Consequently, they will not be described further herein.

Nor is it considered necessary to describe electronic control module 142 in detail. Any suitable system capable of generating an appropriate fuel demand signal can be employed in fuel supply system 18, and the details of module 142 are not part of the present invention.

Briefly, it is the function of electronic control module 142 to process signals representative of the load upon turbine engine 16, the speeds of power turbine 64 ($N_{PT}$) and gas producer turbine 62 ($N_{GP}$), the temperature of the hot gases supplied to the gas producer turbine ($T_5$), and the power turbine temperature ($T_{PT}$) into output signals which can be employed to control the adjustable inlet guide vanes 26 of turbine 16 (GV) and the turbine bleed valve which is not shown in the drawings (BV). The electronic control module 142 also furnishes the fuel demand signal which actuator 143 converts to a mechanical input to fuel supply system flow controller 20.

Referring still to FIG. 2, the major components of fuel flow controller 20 include a $P_{CD}$ actuator 150. This component produces a mechanical output indicative of the pressure of the air discharged from the compressor 22 of turbine engine 16. Another major component of fuel flow controller 20 is a differential linkage assembly 152 which mechanically multiplies the variable inputs from hydroelectric actuator 142 and $P_{CD}$ regulator 150. The output of the differential linkage assembly serves as an actuator for a fuel metering valve 154 through which the fuel flows on its way from the discharge side of pump 144 to the fuel injectors 56 of gas turbine engine 16.

As discussed above, this novel metering of the liquid fuel to gas turbine engine 16 by the product of the variable fuel demand and compressor discharge pressure inputs generated in differential linkage assembly 152 is important. That permits the engine to be rapidly started up and operated under varying loads without the danger of compressor surge. It also allows the engine to be rapidly decelerated without flameout and provides the other advantages identified above.

Referring still to FIG. 2, fuel flow controller 20 also includes a $\Delta P$ regulator 156 employed to maintain a controlled pressure differential across metering valve 154, a pressurizing valve 158 which maintains sufficient back pressure to enable the $\Delta P$ regulator to function properly, and a relief valve 160 which prevents excess pressure buildup in fluid supply system 18.

Referring now to FIGS. 3-6, differential linkage assembly 152 has been shown in a somewhat diagrammatic form in those figures to simplify the explanation of that assembly. In actual practice, the links of that assembly are configured and arranged in a slightly different manner and, in some cases, drilled to lighten the components and to reduce dynamic loads. Movable components are supported by precision ball bearings to insure acurate response of metering valve 154 to the inputs from hydroelectric actuator 143 and $P_{CD}$ actuator 150, to prevent metering valve position errors which might be caused by reaction of friction loads on $P_{CD}$ actuator 150, and to otherwise insure a stable, closed loop operation. Also, a cover will typically be provided to protect the moving components of the linkage assembly from dust and other conditions which might damage or foul the components of the assembly.

Figure 13:
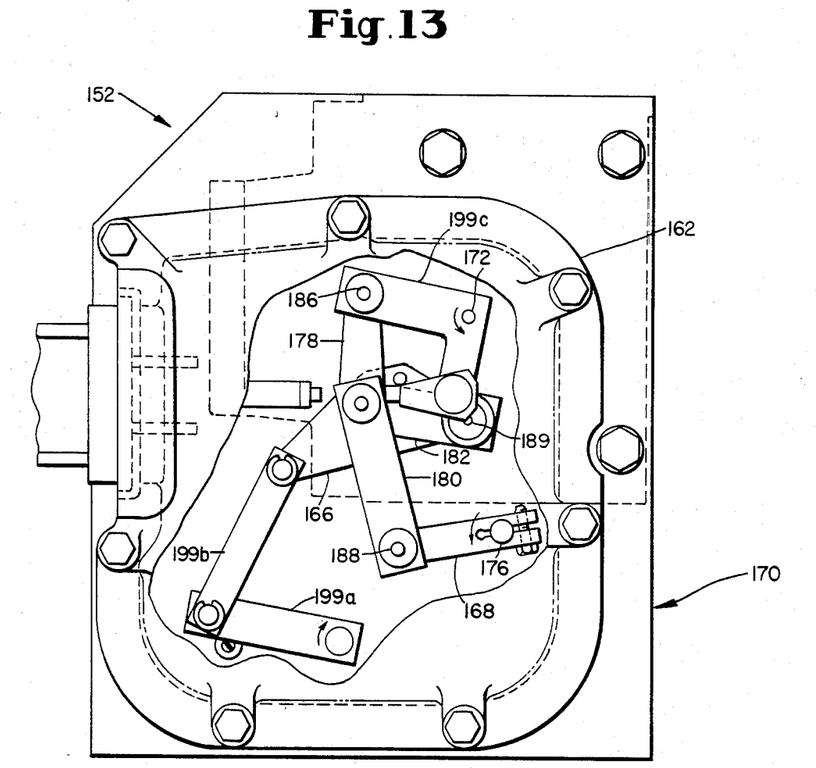
FIG. 13 is a plan view of the differential linkage mechanism shown diagrammatically in FIGS. 3–6; part of the assembly's dust cover has been broken away to show the internal, working parts of the assembly.

One actual preferred differential linkage assembly is illustrated in FIG. 13, the dust cover being identified in that figure by reference character 162.

Referring again to FIGS. 3-6, differential linkage assembly includes a $P_{CD}$ actuator input link 164, a hydroelectric actuator input link 166, and an output link of fuel lever 168 which controls metering valve 154. These links are supported from a base 170 by pivots 172, 174 (see FIG. 6), and 176, respectively.

Also included in the differential linkage assembly are three links 178, 180, and 182 which multiply the displacements of links 164 and 166 and impart to output link 168 a movement having a magnitude indicative of the product of the two inputs. Links 178 and 180 are pivotally connected to each other by pivot member 184 and to input and output links 164 and 168, respectively, by pivot members 186 and 188. Link 182 is connected to links 178 and 180 by pivot member 184 and to hydroelectric actuator input link 166 by pivot member 189.

Stops 190 and 192 on base 170 limit the travel of $P_{CD}$ actuator input link 164. Similarly, stops 194 and 196 mounted on base 170 limit the travel of hydroelectric actuator input link 166, and a stop 198 on input link 166 limits the travel of the displacement multiplying links 178, 180, and 182.

This system of stops mechanically limits the range of operation of the liquid fuel controller. The stops also provide reference points for assembly and calibration of the differential linkage assembly.

As discussed above, differential linkage assembly 152 multiplies the variable fuel demand input from hydroelectric actuator 143 and the variable compressor discharge pressure input from $P_{CD}$ actuator 150. By virtue of the previously described relationship between actuator 143 and electronic control module 142, the differential linkage assembly therefore has a fuel flow rate controlling output which: (a) is responsive to the temperature, speed, and load inputs to the control module; and (b) is trimmed by variations in compressor discharge pressure.

Figure 14:
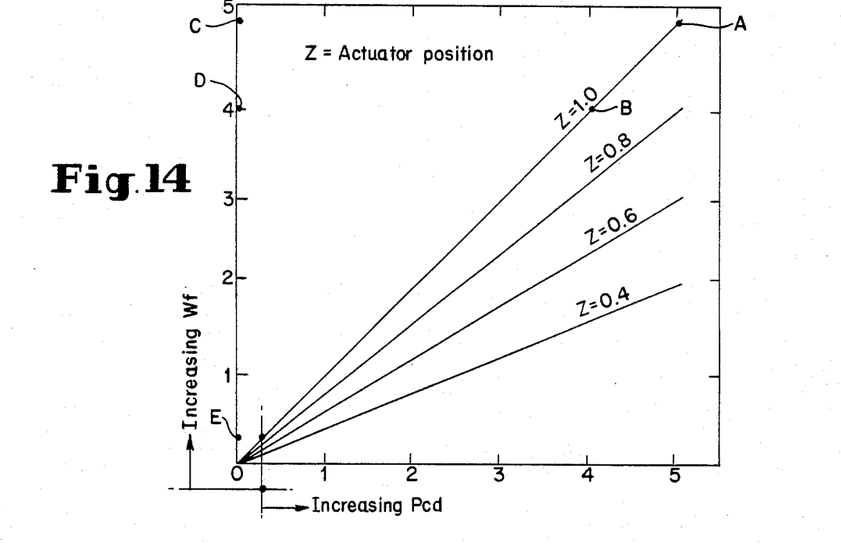
FIG. 14 is a graph included to illustrate the operation of the mechanical differential linkage.

The control philosophy embodied in differential linkage assembly 152 is shown in FIG. 14 in which "Z" represents the positions taken by hydroelectric actuator 143 as engine 16 is accelerated to full load (Z=1.0) and to various part loads down to Z=0.4.

There is a straight line relationship between the position of the actuator and the rate of fuel flow $W_F$ (and differential linkage assembly). This is modified or trimmed by $P_{CD}$. For example, if the engine is operating under full load (differential linkage assembly fuel lever at "A") and the $P_{CD}$ drops from pressure "5" to pressure "4", the linkage assembly will move the fuel lever to "B", decreasing the flow of fuel to engine 16 ($W_F$) from rate "C" to rate "D".

A reverse case is acceleration from cold start (fuel demand maximum and $P_{CD}$ near zero). In this case (see, also, FIG. 4), $W_F$ is initially held to rate "E", despite a maximum demand for fuel by actuator 142, and increased to rate "C" as $P_{CD}$ increases to pressure "A".

In terms of actual hardware, the foregoing is accomplished in differential linkage assembly 152 by variations in the distance between pivot members 174 and 184.

We pointed out above that FIG. 13 shows the actual differential linkage assembly 170 depicted diagrammatically in FIGS. 3–6. Aside from the previously identified dissimilarities, assembly 170 differs in that it has pivotably connected links 199a and 199b for transmitting the movement of hydroelectric actuator 142 to fuel demand input link 166 of assembly 152. It also has a pivotably mounted crank 199c for transmitting the movement of the $P_{CD}$ actuator output to the trim input link 164 of the assembly. These links merely facilitate connections between the interior and exterior of the differential linkage assembly housing. They do not affect the above described operation of the linkage assembly.

Figures 7, 8, 9:
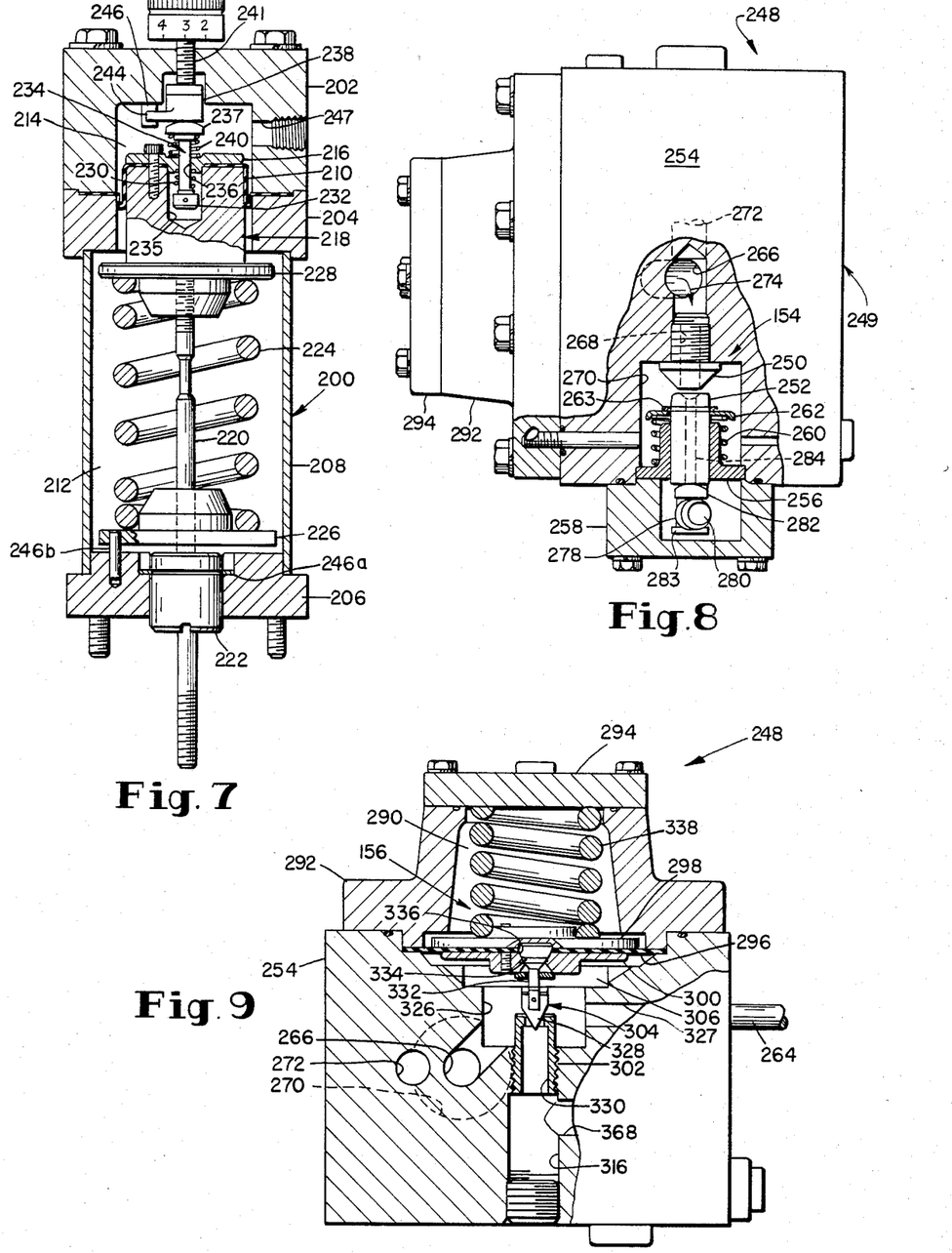
FIG. 7 is a section through a compressor discharge pressure responsive actuator employed in the controller.
FIG. 8 is an elevation of a fuel valve assembly employed in the controller with part of the casing of the assembly being broken away to show a fuel flow metering valve incorporated in the assembly.
FIG. 9 is a section through the fuel valve assembly showing a differential pressure valve incorporated therein.

Referring still to the drawing, FIG. 7 depicts in detail the $P_{CD}$ actuator 150 discussed above. That component of liquid fuel control system 20 includes a housing 200 made up of end wall and adjacent castings 202 and 204 spaced from end wall casting 206 by cylindrical housing member 208. The foregoing housing components are bolted or otherwise fastened together.

Clamped between castings 202 and 204 is a diaphragm 210 which divides the interior of housing 200 into two chambers 212 and 214.

Fixed to diaphragm 210 by a circular clamp 216 and located in housing chamber 212 is an actuator amount 218. Threaded into one end of this mount is an elongated actuator 220. The actuator extends through housing chamber 212 and through a fitting 222 threaded into end wall casting 206 of housing 200 to the exterior of that housing.

Actuator mount 218, along with the actuator and diaphragm 210, is biased toward that end of housing 200 defined by casting 202 by a coil spring 224. That spring extends between a spring seat 226 threaded into fitting 222 and a flange 228 integral with and located toward the end of actuator mount 218 into which actuator 220 is threaded.

The actuator, actuator mount, and diaphragm are, in circumstances related below, also biased in the same direction as they are by spring 224 (i.e., toward end wall casting 202) by a coil spring 230. This spring extends between a boss 232 at the inner end of a plunger 234 and the clamp 216 by which actuator mount 218 is fixed to diaphragm 210.

As shown in FIG. 7, the plunger and spring 230 are located in a cavity 235 in actuator mount 218 with the plunger extending through a bore 236 in clamp 216.

The end of the plunger facing casting 202 and terminating in head 237 is biased toward a stop 238 by a coil sopring 240. The spring extends between the head 237 of the plunger and clamping plate 216.

Springs 230 and 240 support valve plunger 234 in bore 236. Clearance between the plunger and clamp 216 is provided to eliminate friction and any possibility of the plunger sticking.

Stop 238 is fixed to the inner end of a shaft 241 threaded into housing member 202. A control knob 242 fixed to shaft 241 outside housing 200 allows stop 238 to be rotated through an angle (approximately 360°) determined by the engagement of a lug 244 on the stop with a second stop 246 fixed to casting 202.

Rotation of control knob 242 displaces stop 238 toward and away from casting 202, altering the force or bias which spring 240 is able to exert on diaphragm 210 via clamping plate 216. This is used, in fuel flow controller 30, to calibrate the $P_{CD}$ actuator for the altitude at which turbine engine 16 is operated.

Fluid (compressor discharge air in system 18) is admitted to the second chamber 214 in the housing 200 of $P_{CD}$ actuator 150 through an inlet 247 in end wall casting 202. As is apparent from FIG. 7, the force generated by this fluid opposes that generated by springs 224 and 230 and displaces actuator 220 a distance proportional to the fluid pressure. In the application under discussion—controlling the flow of fuel to the injectors of a gas turbine engine—actuator 220 furnishes to a differential linkage assembly 152 a mechanical input having a magnitude proportional to the engine's discharge pressure.

FIG. 7 shows the actuator with its moveable components positioned as they are with minimum pressure in chamber 214. At this stage of operation, spring 240 is biasing the head 237 of plunger 234 against stop 238. Springs 224 and 230 are acting in parallel to displace actuator mount 218 toward the end wall casting 202 of the regulator, and actuator 220 is in its most retracted position.

As the pressure of the fluid chamber 214 increases, the resulting force exerted on diaphragm 210 displaces it, together with actuator mount 218 and actuator 220, toward the opposite end wall 206 of the actuator against the resistance offered by springs 224 and 230. At a specified pressure level determined by the relative dimensioning of springs 224, 230, and 250, spring 240 becomes fully extended; and the head 237 of plunger 234 moves out of contact with stop 238. At this juncture, spring 230 becomes ineffective; thereafter only spring 224 opposes the fluid generated force. In this stage of operation actuator 220 is displaced a greater distance for each unit increase (or decrease) in fluid pressure.

Thus, $P_{CD}$ actuator 150 has two spring rates—a higher one when the fluid pressure in chamber 214 is below a specified level and a lower one when the fluid pressure is above that level.

Spring seat 226 is threaded into insert 222, which is kept from moving relative to end wall casting 206 by a snap ring 246a. The spring seat is held against rotation (and thereby kept from moving longitudinally in housing 200 and changing the spring rate) by a pin 246b extending from it into end wall casting 206.

However, displacement of the spring seat toward and away from end wall casting 206 to vary the bias exerted by spring 224 on actuator mount 218 and diaphragm 210 can be effected by rotating internally threaded insert 222 which is slotted to facilitate this operation. By doing so, one can vary the fluid pressure at which the break in the spring rate discussed above occurs. This is important as it facilitates the initial calibration of the $P_{CD}$ actuator and permits the operation of the actuator to be matched to the particular type of load being driven by turbine engine 16.

Referring again to the drawing, the metering valve 154 operated by the output from differential linkage assembly 152 is incorporated in a fuel valve assembly which is illustrated in FIG. 8 and identified by reference character 248. Also included in that assembly are ΔP regulator 156 and relief valve 160 (see FIG. 10).

Fuel valve assembly 248 includes a casing 249 which will not be described to any considerable extent herein as most details of the casing are not relevant to an understanding of the present invention.

Housed in casing 249 are a valve seat 250 and a metering valve plunger or member 252. The valve seat is threaded into a casting 254 of casing 249.

Valve plunger 252 is supported for rectilinear movement in a guide 256. That guide is mounted in casting 254 and clamped in place by a casting 258 which is part of the valve assembly casing or housing 249.

The valve plunger is biased closed (i.e., toward valve seat 250) by a coil spring 260 extending between valve guide 256 and a spring seat 262 fixed to the inner end of the valve plunger by a snap ring 263. This makes the valve fail-safe and, also, eliminates backlash.

The particular valve design just discussed eliminates the customary close fitting spool and sleeve assembly employed in applications paralleling ours. This is advantageous in that it minimizes hysteresis and enables the metering valve to handle contaminated fuels because the close tolerances needed in a spool and sleeve assembly are eliminated.

Liquid fuel delivered by pump 144 (see FIG. 2) flows through the external fuel line 264 in which filter 148 is incorporated and then seriatim through an internal passage 266 in casting 258 and an internal passage 268 in valve seat 250. From there the fuel can flow to a chamber 270 in the casting and then through an internal discharge passage 272 to pressurizing valve 158.

Referring now to both FIGS. 8 and 13, the rate ($W_F$) at which fuel can flow into internal discharge passage 272 is determined by the distance between plunger 252 and valve seat 250 because $W_F$ is a product of that distance and the circumference of the passage 268 in valve seat 250, and the latter is a constant. The spacing (typically thousandths of an inch) between the valve plunger and valve seat is, in turn, controlled by the angular position of the fuel valve lever 168 in differential linkage assembly 152 as was discussed above.

More specifically, the position of that lever determines the angular position of the pivot shaft 176 on which the lever is mounted and, consequentially, the angular position of an eccentric 278 non-rotatably fixed to that shaft. Rotation of the eccentric, in turn, displaces a roller 280 carried by the eccentric toward and away from valve seat 250. The roller is confined between lands 282 and 283 on valve plunger 252 with essentially zero clearance between the roller and plunger. Consequently, the angular movement of eccentric 278 is accurately translated into linear movement of valve plunger 252 toward and away from valve seat 250.

It is believed that the operation of the fuel metering valve will be apparent from the foregoing. Briefly, however, during the start-up of engine 16, fuel pump 144 is actuated; and fuel accordingly flows through line 264 and filter 148 and then through the passage 266 in fuel valve assembly casing 249 into the internal passage 268 in valve seat 250. The rate of fuel flow is regulated by fuel valve lever 168 and eccentric 278 in the manner just described. As discussed above in conjunction with the operation of differential linkage assembly 162, the position of the fuel valve lever—and, ultimately, the flow of fuel through metering valve 154—is a function of the load on turbine engine 16 and the other inputs to electronic controller 142 as well as the compressor discharge pressure of the engine.

The just-discussed operation of metering valve 154 requires that the pressure drop across that valve be accurately controlled because fuel pressure can vary as engine 16 is accelerated, especially from a start. The $\Delta P$ regulator, in association with the pressurizing valve 158 incorporated in fuel valve assembly 248, automatically compensates for such variations, guaranteeing repeatability of operation.

The $\Delta P$ regulator is housed in part in the casting 254 of the fuel valve assembly housing and partly in a chamber 290 defined by that casting, a cooperating casting 292, and a cover plate 294.

Housed in casting 254 and clamped between that casting and casting 292 is a diaphragm 296 carrying a spring seat 298 on one side and a valve mount 300 on the other. Also housed in casting 254 are a valve seat 302, which is threaded into the casting, and a valve plunger or member 304.

The second (306) of the two chambers into which the interior of casing 249 is divided by diaphragm 296 communicates with the external fuel line 264 on the upstream side of fuel valve assembly 248 via an internal passage 310 in casting 254. From chamber 306 the fuel flows through internal passage 266 to metering valve 154.

The chamber 306 of $\Delta P$ regulator 156 also communicates by way of valve 304, valve seat 302, and an internal passage 316 in casting 254 with an external fuel bypass or return line 318. That line is connected to the fuel supply line on the upstream side of fuel pump 144.

Finally, the chamber 290 in $\Delta P$ regulator casting 292 on the opposite side of diaphragm 296 from chamber 306 is connected through internal passage 322 (see FIG. 2) to the fuel passage 272 on the downstream side of metering valve 154. Passage 322 furnishes communication between the cavity 270 in casting 254 on the downstream side of metering valve seat 250 and the chamber 290 in $\Delta P$ regulator 156. This makes the pressure on the "downstream" side of the metering valve available in chamber 290.

Referring now specifically to FIG. 9, the valve plunger 304 described briefly above is located in a fuel cavity 326 into which fuel flows from external fuel line 264 and internal fuel passage 327. From cavity 326 the fuel flows around the valve plunger through internal passage 266 to metering valve 154. Valve plunger 304 has a conical tip 328 which is engaged with the valve seat 302 to keep fuel from flowing through the internal passage 330 in that seat into fuel bypass passage 316 when the valve is closed.

Plunger 304 is fixed to a valve stem 332 terminating, at its end opposite the valve member, in a swivel 334. The latter is supported in a generally hemispherical cavity 336 in valve mount 300 and retained therein by spring seat 298.

This particular arrangement is important in that it insures good alignment between valve member 304 and valve seat 302 without side loading. This gives good seating and eliminates the friction and sticking common to heretofore available valve designs.

Valve plunger 304 is biased to the closed position illustrated in FIG. 9 by a coil spring 338. Spring 338 is centered on seat 298 and extends from that seat to the cover 394 of the fuel valve assembly casing 249.

As long as the pressure difference across metering valve 154 is at the specified level, the force exerted by spring 338 and that generated by the fuel in chamber 290 at the pressure on the downstream side of metering valve 154 on diaphragm 296 will keep the valve closed.

However, should this specified pressure difference be exceeded, the force generated by the fuel at the pressure on the upstream side of the metering valve and applied to the diaphragm will unseat the valve, allowing fuel to flow through the passage 330 in valve seat 302, the passage 316 in casting 254, and external fuel return or bypass line 318 to the upstream side of fuel pump 144.

This bypassing of excess fuel reduces the pressure on the upstream side of the metering valve, bringing the pressure drop across that valve back to the specified level.

Figure 11:
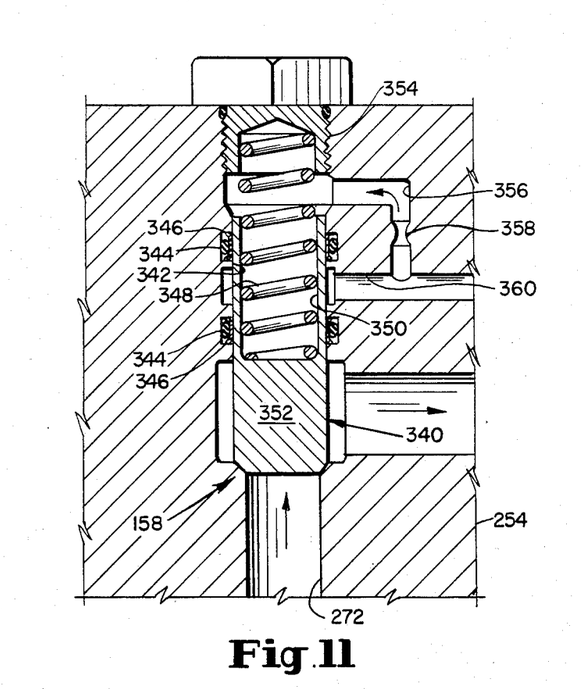
FIG. 11 is a similar view showing a pressurizing valve incorporated in the assembly.

Referring now to FIGS. 2, 8, and 11, it was pointed out above that the prior functioning of the ΔP regulator requires that a minimum back pressure be maintained on the downstream side of metering valve 154 and that this is accomplished by pressurizing valve 158 which in fact keeps the fuel pressure in the entire fuel supply system 18 from going below the minimum required for proper operation of the system. It will be remembered that the pressurizing valve is incorporated in fuel valve assembly 248. With that assembly oriented as shown in FIG. 8, the pressurizing valve occupies the upper right-hand portion of casting 254.

Referring now specifically to FIG. 11, pressurizing valve 158 includes a valve plunger 340 loosely fitted and rectilinearly moveable in a bore 342 formed in casting 254.

O-rings 344 and Shamban seals 346 keep fuel from leaking past the valve member. Valve member 340 is biased by a coil spring 348 toward the closed position, shown in FIG. 11, in which it blocks the flow of fuel in metering valve outlet passage 272. The spring is seated in the hollow interior 350 of the valve plunger and extends from the head 352 of the latter into a spring seat 354 threaded into casting 254.

Like the other valves described above, and hereinafter, pressurizing valve 158 has the advantage that close manufacturing tolerances are not required, making it capable of handling dirty fuel without sticking.

Pressurizing valve 158 is viscous damped for better stability. This is accomplished by connecting the interior 350 of valve plunger 340 through the internal passage 356 in which orifice 358 is formed, internal passage 360, and a third internal passage in casting 254 (not shown) to internal fuel return passage 316. This also provides a fuel return pressure reference for operation of the pressurizing valve.

Especially upon start-up and deceleration or shutdown of engine 16, the back pressure in the fuel line 361 through which the fuel is delivered to the injectors 56 of engine 16 (see FIG. 2) is apt to be too low for proper operation of ΔP regulator 156. In this case pressurizing valve 158 remains closed until the pressure on the downstream side of metering valve 154 and in the fuel passage 272 and, consequently, the pressure in chamber 290 of the ΔP regulator, becomes high enough for proper operation (if the pressure drops below the specified minimum, and the ΔP regulator consequently fails to operate properly, unwanted and deleterious changes in the scheduling of fuel to the injectors 56 of engine 16 may occur).

With the specified minimum pressure in ΔP regulator chamber 290, the force generated by the fuel flowing into the passage 272 on the downstream side of metering valve 154 (and therefore in ΔP regulator chamber 290) becomes high enough to unseat and open valve 158, allowing the metered fuel to flow from the pressurizing valve inlet passage 272 to the valve outlet passage 361 and then to the fuel injectors 56 of gas turbine engine 16. The pressure in chamber 306 and fuel cavity 326 is then sufficient for the excess fuel to flow from fuel cavity 326 into internal bypass passage 316 and, from there, into external fuel line 318, bypassing fuel from the upstream side of metering valve 154 at a rate which is determined by the spacing between ΔP valve plunger 304 and valve seat 302 to keep the pressure drop across seat 250 of metering valve 154 constant.

Should the pressure in passage 272 drop below that required by the ΔP regulator during the operation of engine 16, spring 348 will close the pressurizing valve to the extent necessary to restore the pressure in passage 272 to the specified level.

Figure 10:
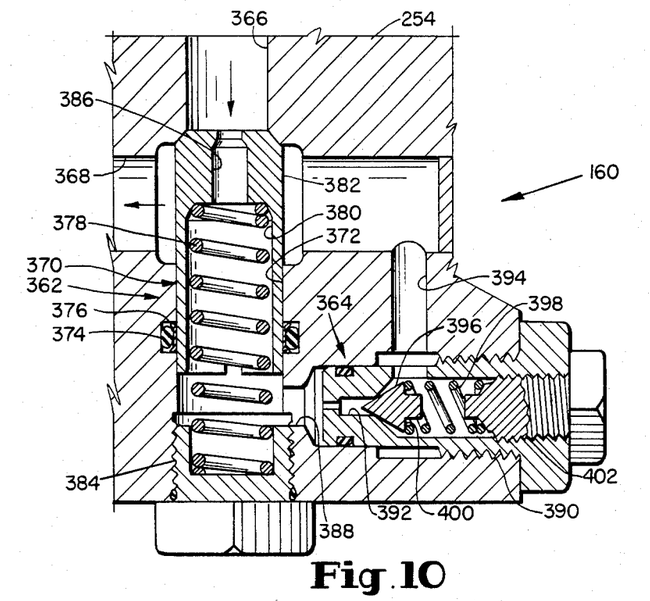
FIG. 10 is a partial section through the assembly showing a two-stage relief valve incorporated therein.

Referring now to FIGS. 2, 9, and 10, the last of the above-discussed major components of fuel supply system 18 is relief valve assembly 160. This assembly, shown in detail in FIG. 10, occupies the lower right-hand portion of fuel valve assembly casting 254 with the assembly oriented as shown in FIG. 9.

The relief valve assembly includes a main relief valve 362 and a pilot valve 364. This two-stage arrangement is employed because it affords superior regulation and because it is more stable than the usual poppet type of relief valve.

Referring now specifically to FIG. 10, the main relief valve is similar in construction to the pressurizing valve just discussed and has the same advantages as the latter. Fuel reaches the valve via internal fuel passage 366 in casting 254 which communicates with external fuel return line 264 (see FIG. 2). With the valve open the fuel can flow through an internal return passage 368 which communicates via return passage 316 to previously discussed external fuel return line 318 (see FIGS. 9 and 2).

Absent excessive fuel pressure in fuel supply system 18, the fuel is kept from flowing from internal passage 366 into return passage 368 by valve plunger 370. This component is loosely fitted and rectilinearly moveable in a bore 372 in casting 254 and is sealed against leakage by an O-ring 374 and Shamban seal 376.

Plunger 370 is biased to the closed position shown in FIG. 10 by a coil spring 378. The spring is seated in a cavity 380 in plunger 370 and extends from the head 382 of the plunger to a spring seat 384 threaded into casting 254.

Main relief valve 362 differs from pressurizing valve 158 in that there is an orifice 386 in the head 382 of the valve. Fuel can flow at a controlled rate from passage 366 through that orifice, the interior 380 of the valve, and a passage 388 in casting 254 to pilot valve 364.

As shown in FIG. 10, the pilot valve includes a valve seat 390 threaded into casting 254. Fuel can flow from passage 388, an orificed passage 392 in the valve seat, and an internal passage 394 in casting 254 into internal fuel return passage 368 when the valve is opened.

Absent excessive pressure in fuel supply system 18, however, such flow of fuel is prevented by valve member 396. That member is biased against the valve seat (both the valve member and seat are hardened to prevent pressure setting shift due to wear) by a coil spring 398. The latter extends between an annular ledge 400 on the valve member and a spring seat 402 which is threaded into valve seat 390.

Should the pressure in fluid supply system 18 exceed the specified maximum, the pressure of that fluid, which can flow from passage 366 into valve seat 390 and against valve plunger 396 through the series of passages discussed above, will exert sufficient force on the plunger to unseat it.

This allows the fluid in the interior of main relief valve plunger 370 to drain into return passage 368, creating a pressure differential across the head 382 of the main relief valve. This overcomes the valve closing force exerted by main relief valve spring 378. The main relief valve then opens, returning fuel to the upstream side of fuel delivery pump 144 to keep components of fuel supply system 18 from being damaged.

It is believed that the operation of fuel supply system 18 will be clear to those versed in the pertinent arts from that which has gone before. An even better understanding of the modus operandi of this system can, however, be had by reference to FIGS. 3-6 and 12.

Figure 12:
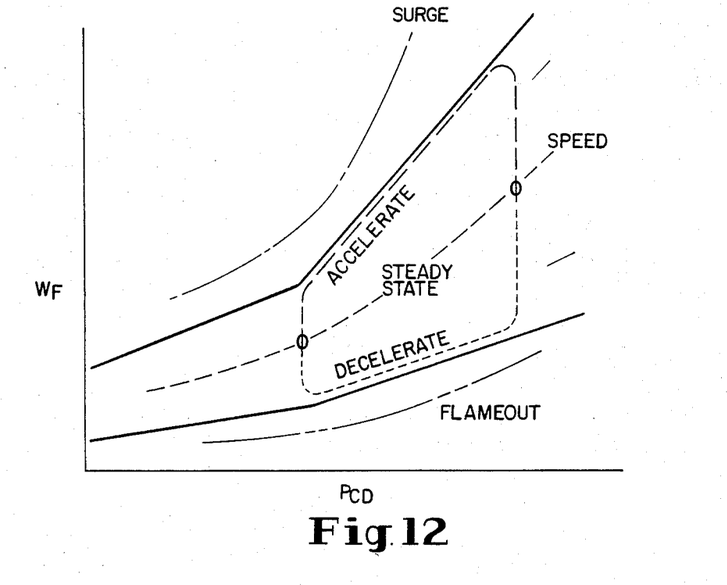
FIG. 12 is a graph showing the fuel schedule maintained by the controller.

As shown in the latter Figure, the flow of fuel to engine 16 is carefully scheduled to keep the ratio of fuel flow $W_F$ to compressor discharge pressure $P_{CD}$ between limits at which flameout would occur on one hand and surge on the other. As discussed above, this is accomplished by multiplying fuel demand and compressor discharge inputs in differential linkage mechanism 152 and employing the product of those two inputs to regulate the position of fuel metering valve 154.

Figure 3:
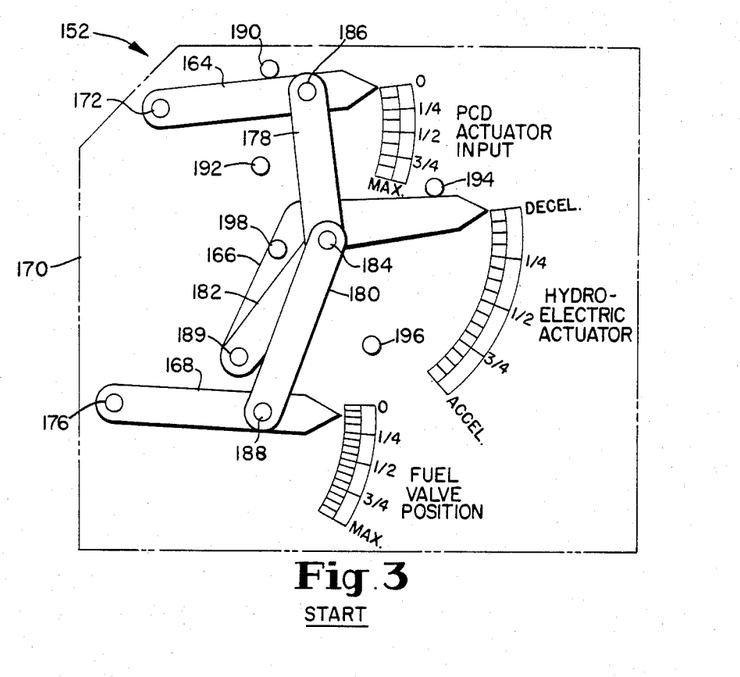
FIGS. 3–6 are schematic views of a differential linkage assembly employed in the flow controller of FIG. 2; they show how the assembly functions at different stages in the operating cycle of the turbine engine.
Figure 4:
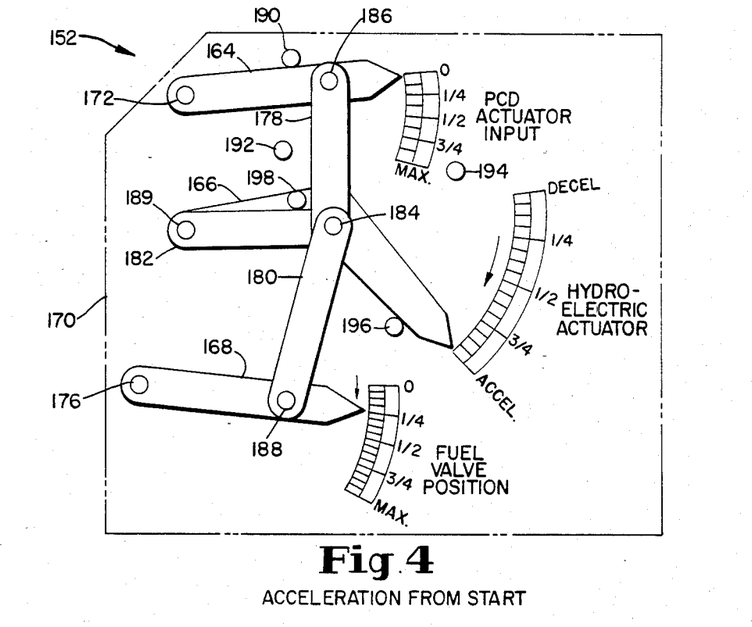
Figure 5:
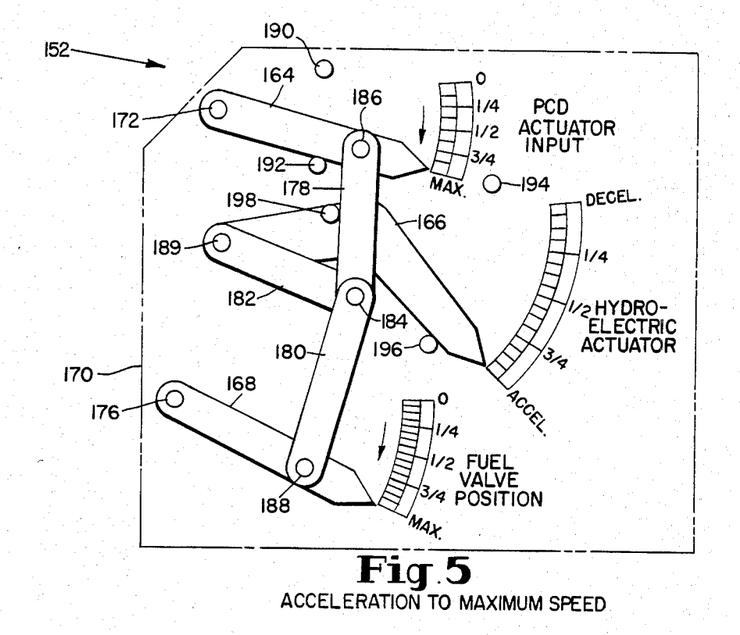

FIG. 3 shows the differential linkage mechanism with its various links positioned as they are when engine 16 is started up. As the engine is brought up to the speed at which combustion can be effected and the engine operated under its own power, a maximum fuel demand signal is transmitted to the differential linkage mechanism as shown in FIG. 4; and metering valve 154 is opened, allowing fuel to be pumped to the injectors 56 of engine 16. However, as the compressor discharge pressure is relatively low in this stage of operation and as the $P_{CD}$ regulator 150 is operating under the higher of its two spring rates, the product of the two inputs is relatively low as indicated in FIG. 4; and fuel is supplied to the engine at a relatively low rate which, as shown in FIG. 12, avoids engine surge.

At the specified breakover point, pressure discharge pressure will have increased considerably as shown in FIG. 12; and the $P_{CD}$ regulator will have shifted to operation at the lower of its two spring rates. Thus, as is apparent from FIGS. 5 and 12, metering valve 154 is rapidly opened wider at this point to rapidly increase the rate of flow of fuel to injectors 56 and to then progressively open the valve until fully open, producing maximum acceleration of the engine.

As full speed is reached, the fuel demand decreases as shown in FIG. 12; and the engine then operates along the steady state curve shown in that Figure.

Figure 6:
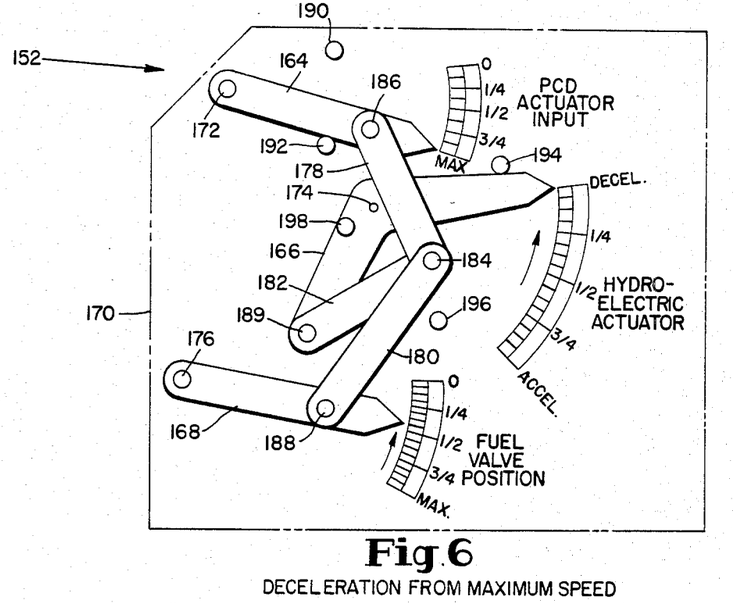

As shown in FIG. 6, shutdown of the engine results in the fuel demand dropping to zero with a corresponding reduction in the fuel supply to engine 16 as shown in FIG. 12. However, because the compressor discharge pressure is still high at this stage, only a partial reduction in the flow of fuel is permitted with this being followed with a more gradual reduction as the compressor discharge pressure drops. This, too, is important as it prevents flameout.

The invention may be embodied in other specific forms without departing from the spirit or essential characteristics thereof. For example, a three dimensional cam or a mechanical link supported on a linearly displaceable pivot member may be employed to effect the multiplication of the compressor discharge and fuel demand variables. Therefore, the embodiment of our invention described above is to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. The combination of a gas turbine engine having a compressor and a combustor with means for controlling the flow of fuel to said combustor comprising: a metering valve means which includes a valve actuator means and means for sensing the discharge pressure of the compressor and for so controlling the operation of said valve actuator means as to provide first a lower and then a higher ratio of fuel flow through said metering valve to compressor discharge pressure as the compressor pressure increases, said compressor discharge pressure sensing and valve actuator controlling means comprising: a housing; a diaphragm mounted in said housing; an actuator mount carried by said diaphragm; an actuator fixed to and movable with said actuator mount; a first spring means fixed relative to said housing at one end thereof for biasing said diaphragm, said actuator mount, and said actuator toward one end of said housing, a plunger relatively movable relative to and carried by said actuator mount, a second spring means extending between said actuator mount and said plunger for similarly biasing said diaphragm, said actuator mount, and said actuator toward said one end of said housing, and means for so admitting compressor discharge air into said housing that the force exerted by said air biases said diaphragm, said actuator mount, and said actuator toward that end of the housing opposite said one end, said first and second spring means being so related that: (a) both act in parallel to bias said diaphragm, said actuator mount, and said actuator toward said one end of said housing until a specified compressor discharge pressure is reached and (b) only one of said springs is thus effective at compressor discharge pressures above said specified pressure.

2. The combination of a gas turbine engine having a compressor and a combustor with means through which fuel can flow to said combustor and flow means for controlling the flow of fuel through said flow means to said combustor, said flow controlling means comprising: a metering valve means; a fuel demand actuator; means for sensing the compressor discharge pressure; and a valve actuator means having inputs with magnitudes which are indicative of fuel demand and of compressor discharge pressure and which are respectively made available by said sensing means and said fuel demand actuator, means for multiplying the magnitudes of said inputs, and means for so operating said valve as to proportion the flow of fuel therethrough to a variable which is the product obtained by said multiplying means, the valve actuator means provided to control the flow of fuel through the metering valve means comprising a mechanical linkage having a base; first and second input members pivotably displaceable relative to said base; an output member pivotably displaceable relative to said base; and means for so connecting said input members to said output member that, as said input members are displaced relative to said base, said output member is displaced relative thereto a distance equal to the product of the distances that the input members are displaced; and that means of the valve actuator means which connects said input members to said output member comprising first, second, and third links each pivotably fixed at one end to one of the aforesaid input and output members and means fixing the opposite ends of said first, second, and third members together for relative pivotable movement about one common axis.

3. The combination of claim 2 wherein the metering valve means of the means for controlling the flow of fuel to the combustor has a linear displacement to fuel flow mode of operation and wherein said fuel flow controlling means also includes means for maintaining a constant pressure across said metering valve which comprises a fuel supply conduit; a differential pressure responsive valve having an inlet communicating with said supply conduit, an outlet, and an actuator which is responsive to the differential in the pressures on said fluid on the upstream and downstream sides of said metering valve; and a bypass conduit communicating between said outlet and said supply conduit into which fuel can be diverted from said metering valve when the pressure across said metering valve exceeds a selected level at a rate determined by the movement of said actuator.

4. The combination of claim 1 wherein the compressor discharge pressure sensing and valve actuator controlling means has means for determining the compressor discharge pressure at which the ratio of fuel flow to that pressure will change between said higher and lower rates and for positioning said actuator at an initial fuel flow setting when the compressor discharge pressure is zero, said last-mentioned means comprising: a spring seat located in said housing and supporting that end of the first spring means nearest said one end of said housing and means accessible from the exterior of said housing for displacing said seat against the bias exerted by said one spring means.

5. The combination of claim 1 wherein said compressor discharge pressure sensing and valve actuator controlling means further comprises means for compensating for changes in the altitude at which said turbine engine is operated, that means comprising a stop located in said housing and engaging said plunger and means accessible from the exterior of said housing for displacing said stop toward and away from said one end of said housing.

6. The combination of claim 2 wherein said valve actuator means has stop means on each side of each of said input members for limiting the displacement of each input member relative to said base.

7. The combination of claim 3 wherein the means for maintaining a constant pressure across said metering valve also comprises a pressurizing valve on the downstream side of said metering valve for maintaining on the actuator of said differential pressure responsive valve a back pressure which is sufficiently high that said actuator can act to bypass fuel through said bypass conduit and thereby keep the pressure differential across said metering valve constant under all operating conditions of the turbine engine.

8. The combination of claim 2 wherein the means for controlling the flow of fuel to said metering valve comprises a fuel supply conduit communicating with said metering valve, a pump in said conduit means, a filter in said conduit downstream from said pump, a bypass conduit communicating with said fuel conduit on the downstream and upstream sides of said pump, and a relief valve in said bypass conduit, said bypass conduit being communicated with said fuel conduit on the upstream side of said filter to isolate said relief valve from the effect thereon of the pressure drop across the filter.

9. The combination of claim 2 wherein the means for controlling the flow of fuel to said metering valve comprises a fuel supply conduit communicating with said metering valve, a pump in said conduit, a filter in said conduit downstream from said pump, a bypass conduit communicating with said fuel conduit on the downstream and upstream sides of said pump, and relief valve means in said bypass conduit, said relief valve means comprising a main relief valve and an adjustable pilot valve for setting the pressure at which said main relief valve will open.

10. The combination of claim 2, wherein means for sensing the discharge pressure of the compressor has means for so controlling the operation of said valve actuator means as to provide first a lower and then a higher ratio of fuel flow to compressor discharge pressure as the compressor discharge pressure increases.

11. The combination of claim 10 wherein the means for sensing the discharge pressure of the compressor also includes means for varying the pressure at which the ratio of fuel flow to compressor discharge pressure will change.

12. The combination of claim 2 wherein the means for controlling the flow of fuel to the combustor comprises means for compensating for changes in the altitude at which said turbine engine may be operated.

* * * * *

UNITED STATES PATENT AND TRADEMARK OFFICE
CERTIFICATE OF CORRECTION

PATENT NO. : 4,506,503

DATED : March 26, 1985

INVENTOR(S) : Ogborne et al

It is certified that error appears in the above-identified patent and that said Letters Patent is hereby corrected as shown below:

Column 6, line 64, change "inerreases" to --increases--.

Column 7, line 51, change "sopring" to --spring--.

Signed and Sealed this

Fifth Day of November 1985

[SEAL]

Attest:

Attesting Officer

DONALD J. QUIGG

Commissioner of Patents and Trademarks